US009138940B2

(12) United States Patent
Post et al.

(10) Patent No.: US 9,138,940 B2
(45) Date of Patent: Sep. 22, 2015

(54) WINCHESTER PRINT HEAD

(71) Applicant: Type A Machines, Inc., San Francisco, CA (US)

(72) Inventors: Elijah Post, San Francisco, CA (US); Andrew Rutter, San Francisco, CA (US)

(73) Assignee: Type A Machines, Inc., San Francisco, CA (US)

( * ) Notice: Subject to any disclaimer, the term of this patent is extended or adjusted under 35 U.S.C. 154(b) by 0 days.

(21) Appl. No.: 13/844,084

(22) Filed: Mar. 15, 2013

(65) Prior Publication Data

US 2014/0263534 A1    Sep. 18, 2014

(51) Int. Cl.
| | | |
|---|---|---|
| *B29C 67/00* | (2006.01) | |
| *B29C 47/12* | (2006.01) | |
| *B29C 47/86* | (2006.01) | |

(52) U.S. Cl.
CPC ............. *B29C 67/0085* (2013.01); *B29C 47/12* (2013.01); *B29C 47/862* (2013.01); *B29C 67/0055* (2013.01)

(58) Field of Classification Search
CPC .................................................. B29C 67/0055
USPC ................. 226/186, 187; 242/615.3; 425/375
See application file for complete search history.

(56) References Cited

U.S. PATENT DOCUMENTS

| | | | |
|---|---|---|---|
| 5,340,433 A * | 8/1994 | Crump ........................... | 156/578 |
| 5,503,785 A | 4/1996 | Crump et al. | |
| 5,597,520 A | 1/1997 | Smalley et al. | |
| 5,730,817 A | 3/1998 | Feygin et al. | |
| 5,939,008 A * | 8/1999 | Comb et al. .................. | 264/308 |
| 5,968,561 A * | 10/1999 | Batchelder et al. ............ | 425/375 |
| 6,004,124 A * | 12/1999 | Swanson et al. ............... | 425/375 |
| 6,022,207 A * | 2/2000 | Dahlin et al. .................. | 425/145 |
| 6,054,077 A * | 4/2000 | Comb et al. .................. | 264/40.7 |
| 6,129,872 A | 10/2000 | Jang | |
| 6,685,866 B2 | 2/2004 | Swanson et al. | |
| 6,722,872 B1 | 4/2004 | Swanson et al. | |
| 6,790,403 B1 | 9/2004 | Preideman, Jr. et al. | |
| 6,907,307 B2 | 6/2005 | Chen et al. | |
| 7,169,337 B2 | 1/2007 | Swanson et al. | |
| 7,374,712 B2 | 5/2008 | Swanson et al. | |
| 7,384,255 B2 | 6/2008 | LaBossiere et al. | |

(Continued)

OTHER PUBLICATIONS

"MakerBot Stepstruder MK7", MakerBot Stepstruder MK7 by MakerBot—Thingiverse. Printed from Internet at http://www.thingiverse.com/thing:11734 on Mar. 3, 2013., 7 pgs.

(Continued)

*Primary Examiner* — William E Dondero
(74) *Attorney, Agent, or Firm* — Schwegman Lundberg & Woessner, P.A.

(57) ABSTRACT

An apparatus to receive a filament material and to move the filament while guiding a direction of movement of the filament comprising:
  a metal block that defines a first guide passage sized to receive the filament;
  wherein the block includes a first plate that includes a first surface that defines a first groove and includes a second plate that includes a second surface that defines a second groove; and
  wherein the first and second faces of the first and second plates are in abutting contact with the first and second grooves aligned to define the first guide passage;
  a drive mechanism configured to move the filament into the first guide passage.

10 Claims, 9 Drawing Sheets

(56) References Cited

U.S. PATENT DOCUMENTS 8,123,999 B2   2/2012   Priedeman, Jr. et al.
8,157,202 B2   4/2012   Taatjes et al.
8,226,395 B2   7/2012   Pax et al.

OTHER PUBLICATIONS

"Minimalistic Mk7 replacement by whosawhatsis", Minimalistic Mk7 replacement by whosawhatsis—Thingiverse. Printed from Internet at http://www.thingiverse.com/thing:15718 on Mar. 3, 2013., 6 pgs.

"MK4 Spring Loaded Idler", MakerBot Thingiverse, [Online]. Retrieved from the Internet: <URL: http://www.thingiverse.com/thing:3609>, (Jul. 25, 2010), 5 pgs.

"The MakerBot Replicator 2—Spring-Loaded Drive Block Installation", http://www.youtube.com/watch?v=ZdOS5NP5eaE&feature=youtu.be; printed on Mar. 3, 2013 from Internet., 4 pgs.

"Extruders"—MakerGear—printed off Internet Feb. 11, 2015 at makergear.com, 2 pgs.

* cited by examiner

WINCHESTER PRINT HEAD

BACKGROUND

Three dimensional objects have been manufactured using fused filament fabrication techniques in which a fabrication material is heated to a flowable state and is deposited upon previously deposited solidified layers of the material in a pattern determined based upon design information provided within a mathematical computer aided design (CAD) model. The material is heated to the flowable state and is deposited layer-by-layer upon previously deposited layers that have cooled sufficiently to be in a sufficiently solidified state to provide a structurally stable layer for deposition of a new layer. Each successive newly deposited layer cools, solidifies and adheres to a previously deposited layer of material with an adequate bond upon solidification. In this manner, layers of material progressively build up and solidify to form a three-dimensional object resembling the CAD model.

The fabrication material is fed to a print head, sometimes referred to as an extrusion head, that inputs the material in a solid state, heats it to a flowable state, and outputs the fabrication material in the flowable state for deposition in the pattern determined by the CAD model. The print head ordinarily includes a liquefier, a dispensing nozzle and a drive mechanism. The drive mechanism drives the material in a solid state to the liquefier and out through the nozzle in a liquid state.

In the past, a drive roller and idler roller pair have been used to advance a flexible filament fabrication material through print head. As the roller pair advanced the filament into the print head, the force of the incoming filament strand extrudes the flowable material out from the dispensing nozzle where it is deposited onto previously extruded solidified layers of the material mounted upon a build platform. The flow rate of the material extruded from the nozzle is a function of the rate at which the filament is advanced to the head and the size of the dispensing nozzle orifice.

The print head typically is moveably mounted upon a support structure. Motors are provided to move of the print head within a horizontal x, y plane parallel to the build platform and to move the platform in a vertical z-direction perpendicular to the plane of movement of the print head. An electronic controller controls the motors to control movement of the print head in the horizontal plane and to control z-direction movement of the build platform. The controller also controls the rate at which the drive mechanism advances the material through the print head. By controlling these processing variables in synchrony, the material is deposited at a desired flow rate in pattern, layer-by-layer, in areas defined from the CAD model. The dispensed material solidifies upon cooling to create a three-dimensional solid object.

The dispensing nozzle often is incorporated as a part of a disposable component sometimes referred to as a 'hot end' in which the phase transformation of a filament from solid to liquid occurs. The dispensing nozzle is formed of a highly heat conductive metal, typically brass. The filament is fed to the nozzle though an elongated pipe, or barrel, also formed of metal. The phase transition takes place within the pipe. A solid state filament material is fed in one end of the metal pipe, and liquid state material flows out from the other end of the pipe to the dispensing nozzle. The disposable component comprising the dispensing nozzle periodically requires replacement because foreign matter accumulates inside resulting in irregular flow or even blockage. For example, solid fragments of the modeling material may become lodged inside the pipe due to turning on and off the liquefier resulting in molten material solidifying within the component.

DESCRIPTION OF EMBODIMENTS

Figure 1:
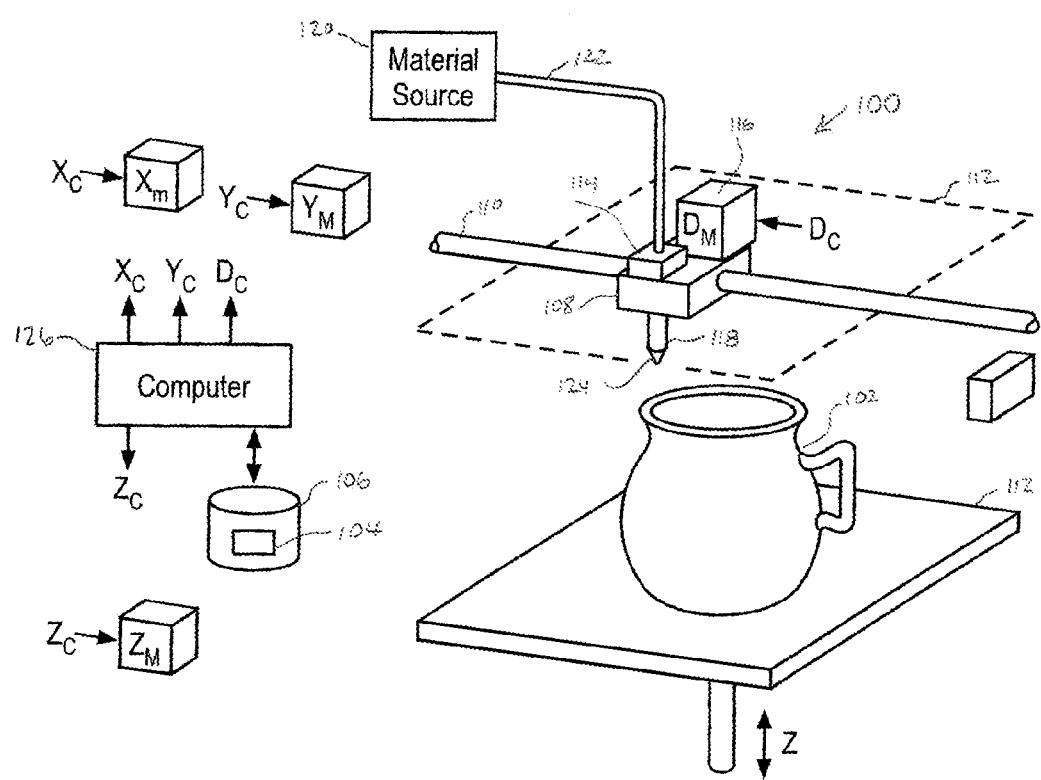
FIG. 1 is an illustrative drawing representing a computer controlled machine that uses fused filament fabrication to produce a three dimensional object that represents a three dimensional model stored in a computer readable memory device in accordance with some embodiments.

The following description is presented to enable any person skilled in the art to make and use a print head for use in a computer controlled machine that uses fused filament fabrication to produce a three dimensional object according to a computer aided design (CAD) model stored in a computer readable storage device. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. Identical reference numerals may be used in this disclosure to represent different views of the same item in different drawings. Thus, the present invention is not intended to be limited to the embodiments shown, but is to be accorded the widest scope consistent with the principles and features disclosed herein.

FIG. 1 is an illustrative drawing representing a computer controlled machine 100 that uses fused filament fabrication to produce a three dimensional object 102 that represents a three dimensional model 104 stored in a computer readable memory device 106 in accordance with some embodiments. A print head 108 is mounted on a support structure 110 that is configured to enable movement of the print head in a horizontal x, y plane that is indicated by dashed lines. A base platform 112 that is moveable in a vertical z-direction is disposed beneath the print head 108. The object 102 that is under construction sits upon the platform 112.

The print head 108 includes a filament drive mechanism 114, a drive motor 116 and a hot end 118. A fabrication material source 120 is coupled to feed a continuous filament (not shown) through an elongated tube 122 to the print head 108 in response to the filament drive mechanism 114. In some embodiments, the elongated tube interconnects 122 the material source 120 and the filament drive mechanism 114. The drive motor 116 is coupled to drive the filament drive mechanism 114 so as to advance the filament from the drive source 120 to the hot end 118. The hot end 118 includes a dispensing nozzle 124 and a liquefier (not shown). The liquefier heats the filament causing it to undergo a phase change from solid to liquid. The nozzle dispenses the material in molten liquid form.

A cooling element such as a fan is disposed to rapidly cool the liquefied material once it has been dispensed from the nozzle. In some embodiments, the upon being dispensed from the nozzle, the fabrication material comprises low viscosity plastic that has a high heat retention. For example, in some embodiments, the material comprises a thermoplastic such as PLA, ABS, EVA, PVA or Nylon, for example. The cooling element is used to rapidly cool the material so that it is sufficiently solid when the next layer is dispensed to avoid distortion of the shape of the fabricated object.

A computer 126 provides x-direction control signals $X_c$, y-direction control signals $Y_c$, z-direction control signals $Z_c$ and filament drive control signals $D_c$, respectively, to an X-motor $X_m$, Y-motor $Y_m$, Z-motor $Z_m$ and D-motor $D_m$ as indicated. The control signals are provided in response to the CAD design file 104 stored in a computer readable device 106. The control signals $X_c$, $Y_c$, control the X-motor and Y-motor to control x, y position of the movement print head 108. The control signals $Z_c$ control the Z-motor to control the z-position of the base platform 112. It will be appreciated that in some embodiments, the base platform 112 is moved progressively vertically downward as additional layers are added to the object 102 that is under construction. The control signals $D_c$ control the D-motor to control the rate at which the filament is driven from the source 120 and to the hot end 118, and therefore, regulates the material dispensing rate. Details of positioning and movement control of the print head 108 and of the base platform 112 and control of the dispensing rate will be understood by those skilled in the art need not be described in detail herein.

Figure 2A:
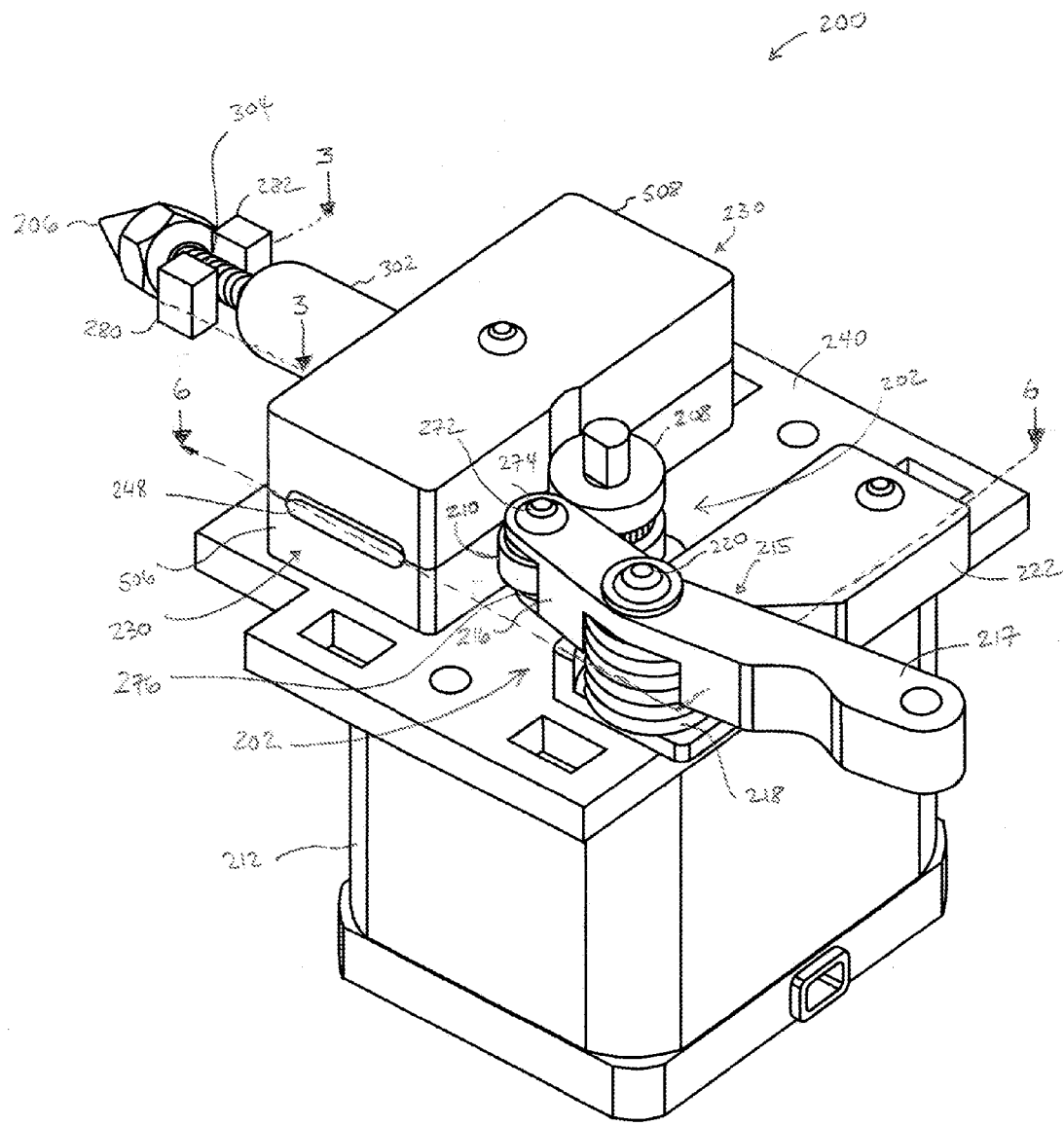
FIG. 2A is a perspective view of a print head in accordance with some embodiments.
Figure 2B:
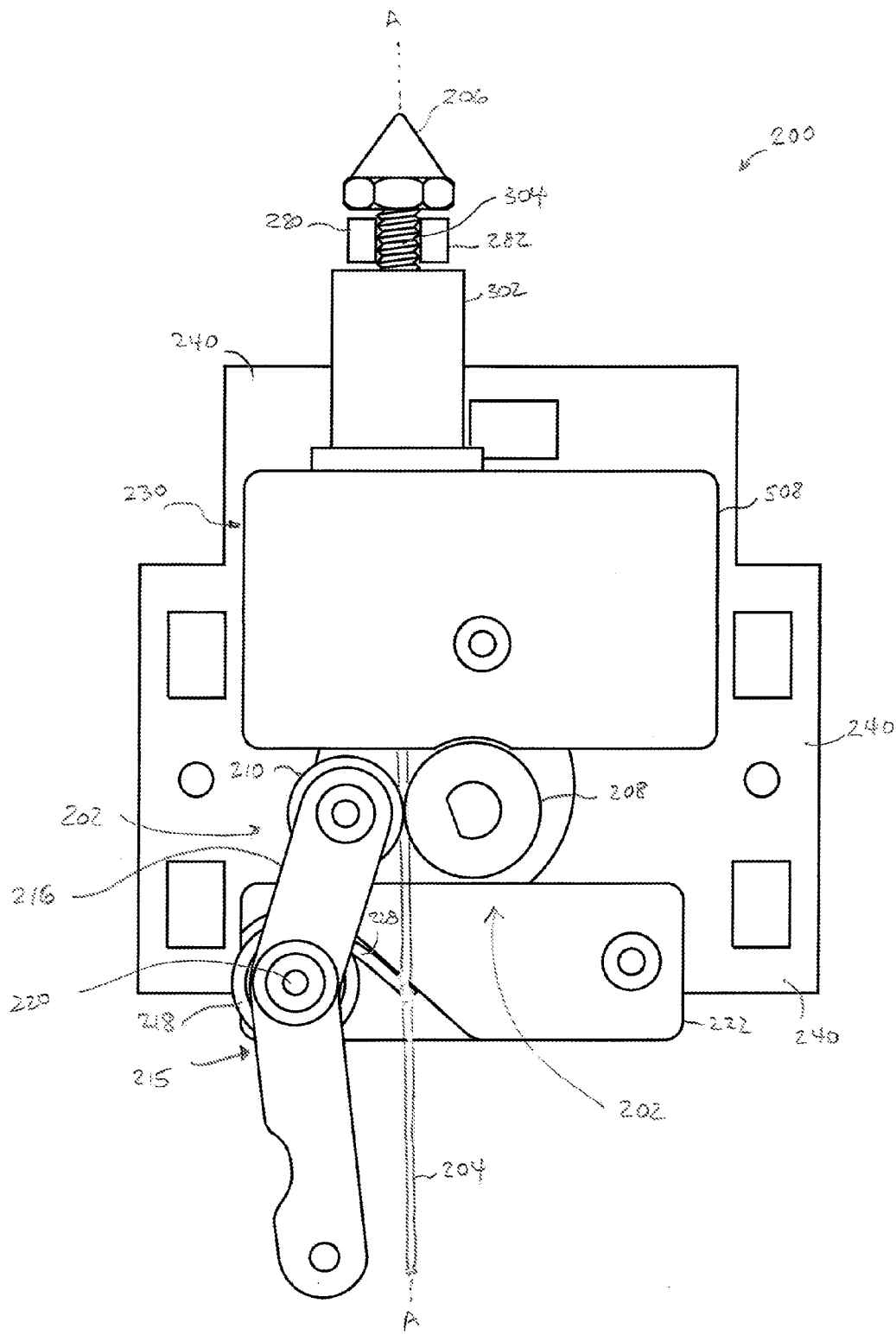
FIG. 2B is a side elevation view of the print head of FIG. 2A in accordance with some embodiments.
Figure 2C:
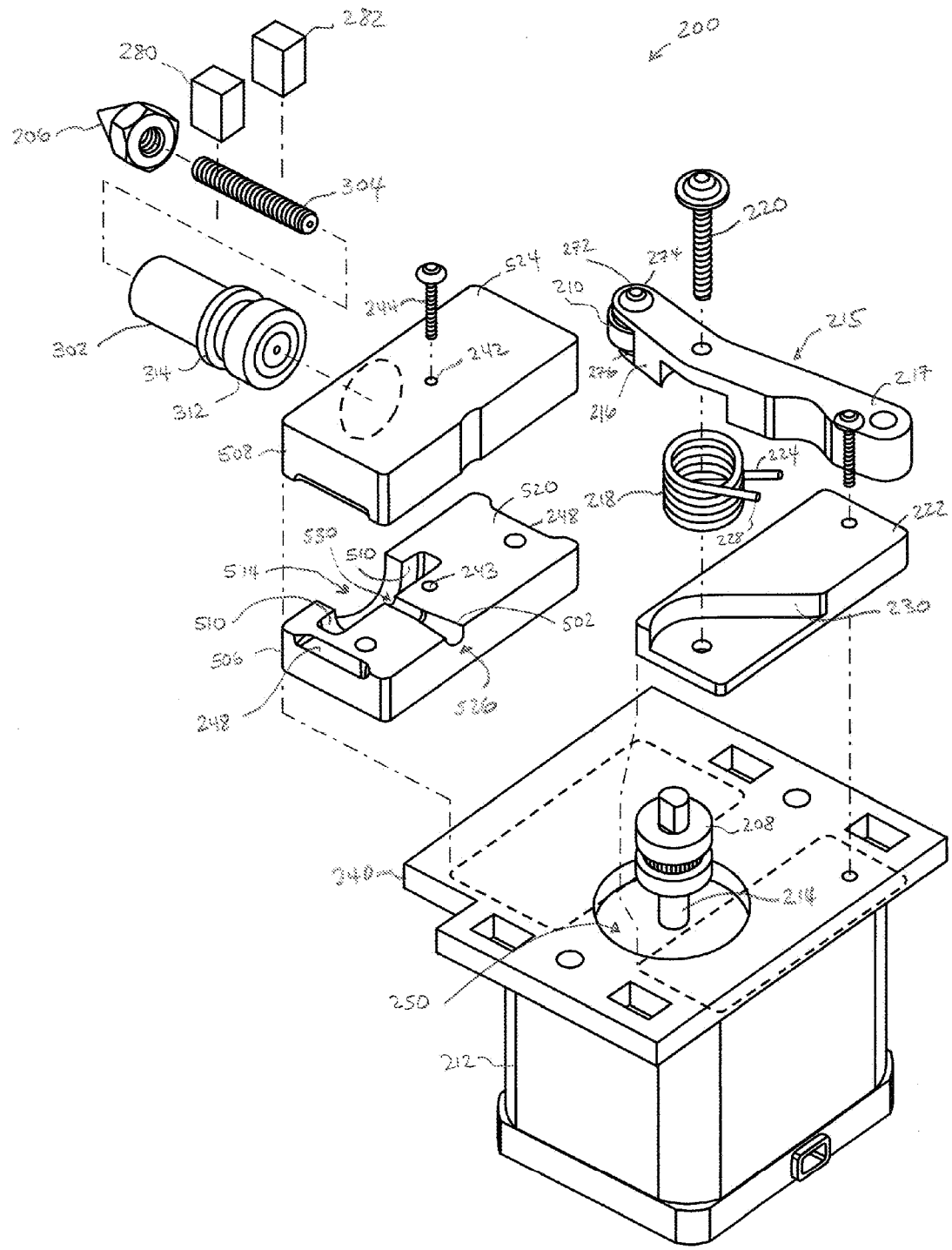
FIG. 2C is an exploded view of the print head of FIG. 2A in accordance with some embodiments.

FIGS. 2A-2C provide a perspective view, side elevation view and exploded view, respectively, of a print head 200 in accordance with some embodiments. The print head 200 includes the motor-driven drive mechanism 202 that is disposed to feed a filament 204 (FIG. 2B) along an axis A-A through first and second filament guide passages, illustrated in FIGS. 3, 5A, 5B and 6, that are aligned to provide a straight-line path to a dispensing nozzle. It will be appreciated that the material that forms the filament melts to a liquid form by the time it reaches the dispensing nozzle. Referring to FIGS. 2C, 5A, 5B and 6 a first guide passage 602 is defined by complementary first and second grooves 502, 504 formed in first and second plates 506, 508. A second guide passage 306 is defined by a tube defined in part by a low thermal conductivity housing 302 and defined in part by the high thermal conductivity metal pipe 304, which is inserted within the housing 302. The housing 302 is sometimes referred to as a nozzle holder since it acts as an insulated carrier for the nozzle 206, which is connected to the pipe 304. The first and second plates 506-508 releasably clamp about the housing 302, which acts to thermally insulate from the pipe 304, portions of the filament 204 that have not yet been advanced to the pipe 304. The pipe 304 is heated to convert the fiber material from a solid state to a liquid state, and the housing 302 prevents premature melting of the solid fiber 204, which could cause problems such as premature loss of structural rigidity of the filament making it difficult to controllably advance the filament using the drive mechanism 202 and causing jamming, for example. The first and second plates 506, 508 clamp the housing 302 with the pipe 304 disposed inside in a fixed position so as to align in a straight line the first guide passage 602 defined by the grooves 502, 504 and the second guide passage 306 defined by the housing and the pipe along axis A-A.

Figure 3:
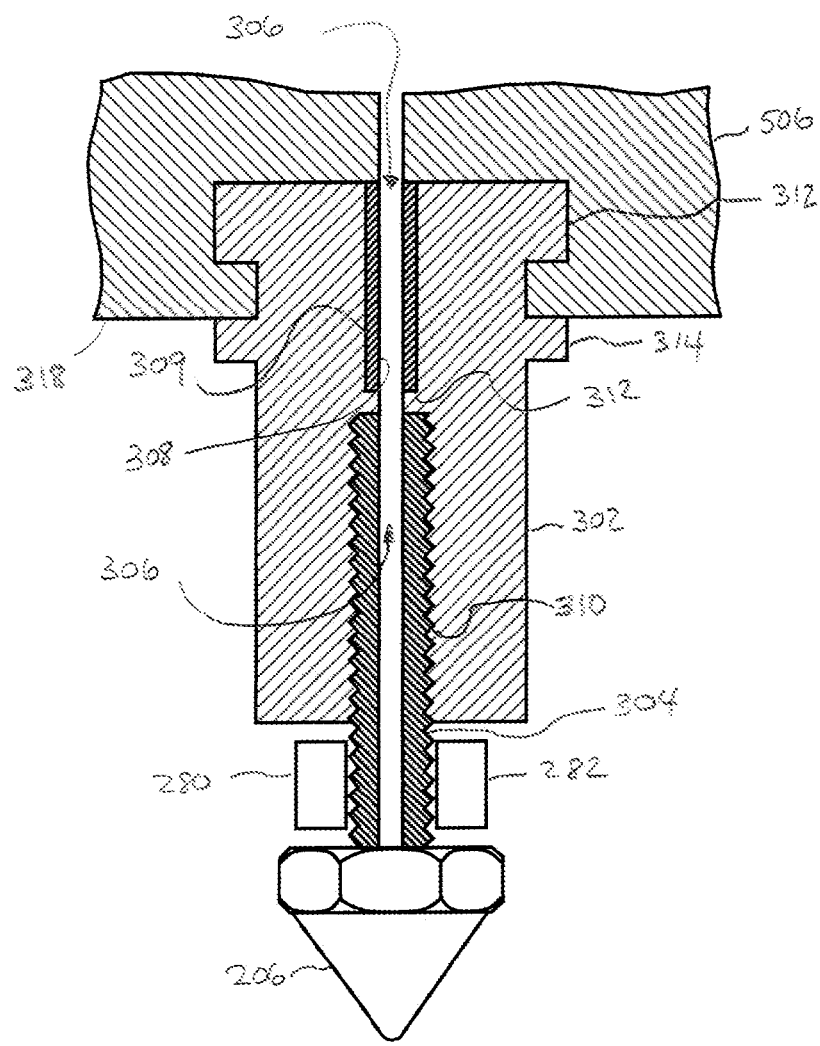
FIG. 3 is an illustrative cross sectional view along dashed lines 3-3 in FIG. 2A of the low thermal conductivity housing and the metal pipe partially housed therein groove mounted within a clamping plate of the print head of FIGS. 2A-2C in accordance with some embodiments.

FIG. 3 is an illustrative cross sectional view along dashed lines 3-3 in FIG. 2A of the low thermal conductivity housing 302 and the metal pipe 304 partially housed therein groove mounted within the first clamping plate 506 of the print head 200 of FIGS. 2A-2C in accordance with some embodiments. The nozzle 206 is mounted at a distal end of the pipe 304. The housing 302 and pipe 304 arranged with the nozzle mounted on the pipe are known in the art. The housing 302 is formed of high strength heat insulating material, such as PEEK, for example, for structural strength. The housing defines two inner tube sections. A smaller diameter first inner tube section 308 is lined with a low friction, low strength, heat insulating material 309 such as PTFE, for example, to provide for low friction movement of the filament therethrough. A wider diameter second inner tube section 310 is sized to receive the pipe 304. The housing 302 defines an inner shoulder 312 at the interface of the first and second inner tube sections 308, 310. The pipe 304 and the second inner tube section 310 are threaded so that the pipe can be screwed securely within the housing with a first end of the pipe abutting the inner shoulder 312 and a second end extending outward from the housing and being secured to the nozzle 202. It will be noted that a portion of the pipe adjacent the shoulder is smooth as is a corresponding portion of the second inner tube.

The housing 302 is generally cylindrical in shape and defines a first (upper) outward extending annular ring 312 and second (lower) outward extending annular ring 314. The first and second annular rings 312, 314 extend outwardly about the region of the housing defining the first inner tube portion 308. The annular rings 312, 314 define a mounting 514 sized to snugly interfit with corresponding complementary annular recessed surfaces regions 510, 512 formed in the first and second plates 506, 508. It will be appreciated that the low thermal conductivity housing 302, when groove mounted between the first and second plates 506, 508, acts to thermally insulate the plates and the filament guided 202 through the first guide passage 602 defined by the clamped-together plates 506, 508 therein from the heated pipe 304.

The drive mechanism 202 includes a drive roller 208 and an idler roller 210 that are disposed to capture the filament 202 between them with the filament 202 filament in alignment with the first and second guide passages 602, 306. The drive roller 208 is driven by a motor 212. In some embodiments, the drive roller 208 is mounted upon a motor shaft 214. A beam 215 includes first and second beam arms 216, 217. The idler roller 210 is rotatably mounted upon a first arm 216 of an angled beam 218. A spring 220 urges the first beam arm 216 mounted idler roller 210 to press the filament 202 firmly against the drive roller 208. Rotation of the drive roller 208 imparts a force to the filament 202 that pulls the filament towards or away from the first guide passage 602, depending upon the direction of rotation of the drive roller 208.

The beam 215 is rotatably mounted upon a pivot 220 that upstands from a fixed-position fulcrum block 222. The pivot 220 has an axis of rotation that is parallel to the axes of rotation of the driver roller 208 and of the idler roller 210 and is disposed adjacent to a path along which the filament 202 passes when pulled into or out of the first filament guide 602 in response to rotation of the drive roller 208. The first and second beam arms 216, 217 extend from the pivot 220 at an obtuse angle to each other generally toward a path, along axis A-A, along which the filament 202 passes. The first beam 216 arm extends between the pivot 220 and the idler roller 210 and the second beam arm 217 extends at an obtuse angle in a direction generally away from the idler roller 210. The idler roller 210 is rotatably secured to an end of the first arm 216 distal from the pivot 220 and adjacent the driver roller 208.

Figure 4:
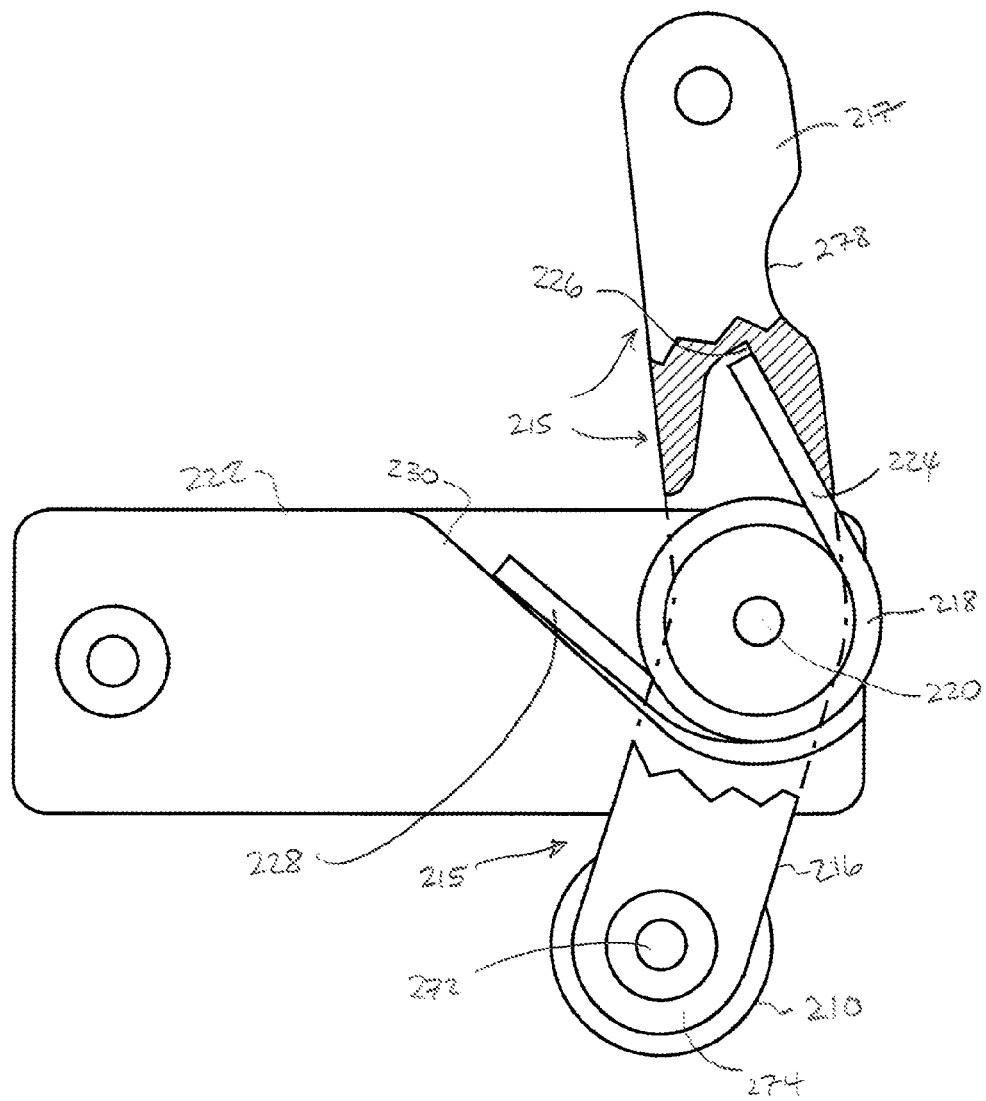
FIG. 4 is an illustrative view of the beam mounted on the fulcrum block of the print head of FIGS. 2A-2C with partial cut-away to show spring bias in accordance with some embodiments.

FIG. 4 is an illustrative view of the beam 215 mounted on the fulcrum block 222 with partial cut-away to show spring bias in accordance with some embodiments. A lever spring coil 218 is mounted axially about the pivot 220 and includes a first leg 224 that engages a first groove wall 226 formed in the second beam arm 217 that includes a second leg 228 that engages a second groove wall 230 formed in the fulcrum block 222 adjacent the second beam arm 217. The spring 218 is biased to urge the first beam arm 216 and the idler wheel 210 mounted thereon toward the driver roller 208. More particularly, the spring 218 is biased to provide a rotational force, about the pivot 220, to the beam 215 that urges the idler roller 208 rotatably mounted thereon to press the filament 202 firmly against the driver roller 208. In some embodiments, when the idler roller 210 is disposed so as to urge the filament against the driver roller, the second beam arm 217 extends in a direction generally parallel to the path along which the filament 202 passes.

A user may apply a force to the second arm 217 in a direction generally toward the driver roller 208 so that the second arm 217 acts as a lever through which the user-applied force is transferred through the second arm and acts in opposition to the force of the spring 218, so as to move the idler roller 210 away from the driver roller 208. In some embodiments, the spring 218 is biased so that exerting a sufficient force upon the second beam arm 217 in a direction generally towards the path along which the filament 202 passes causes rotation of the beam 215, resulting in the first beam arm 216 and the idler arm 210 mounted thereon to rotate away from the driver roller 208, thus allowing a user to more easy access to insert filament 202 to or to remove filament 202 from the first guide passage 602.

Figure 5A:
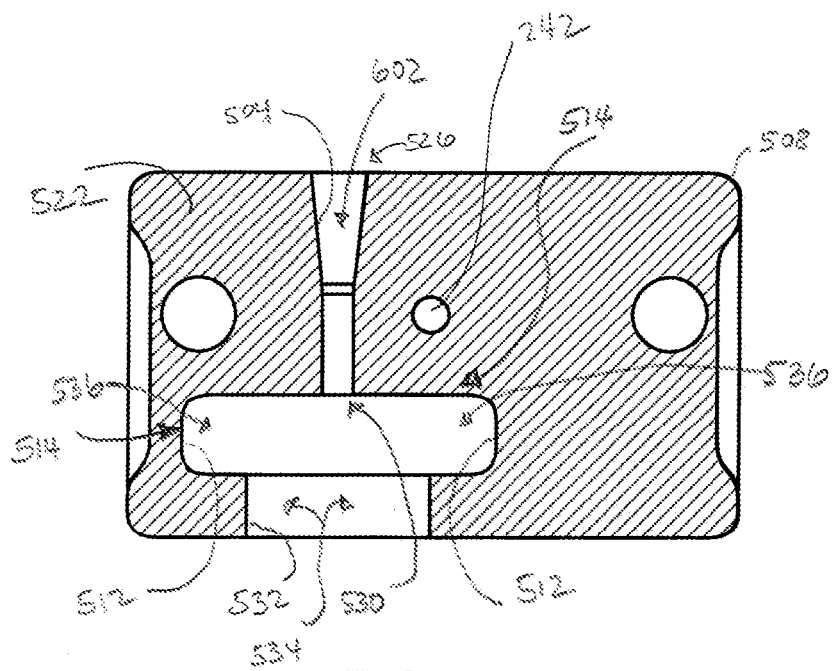
FIGS. 5A-5B are illustrative drawings that show first opposed facing surfaces of the clamp plates of the print head of FIGS. 2A-2C in accordance with some embodiments.
Figure 5B:
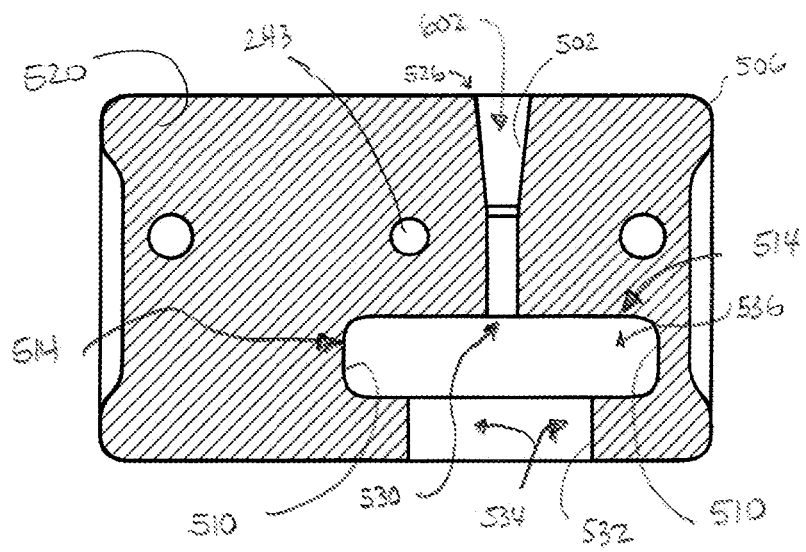

FIGS. 5A-5B are illustrative drawings that show first opposed facing surfaces 520, 522 of the high thermal conductivity clamp plates in accordance with some embodiments. The first and second plates 506, 508 are assembled together to produce a block 230 that comprises the two plates 506, 508 and that defines the first guide passage 602 and an insulating housing mount portion 514 defined generally by the recessed surfaces 510, 512. Inner facing surfaces 520, 522 of the plates are substantially planar so as that they closely fit together when placed into abutment with each other. In some embodiments, the first and second plates 506, 508 are formed of metal, specifically, aluminum. Alternatively, the plates could be formed of a different material that is highly thermally conductive and easily machined such as copper, for example. The first plate 506 includes an inner facing top surface 520 and an outer facing bottom surface (not shown). The second plate 508 includes an inner bottom 522 surface and an outer facing top surface 524. The inner facing surfaces 520, 522 of the first and second plates 506, 508 define the first guide passage 602. The annular recessed surface regions 510, 512 formed in inner facing surfaces 520, 522 are sized to receive the housing 302. It will be understood that orientations used herein such as top or bottom or side are for reference purposes only and that actual orientation may vary depending upon positioning of the print head components when in actual use.

More specifically, the first groove 502 extends across the inner facing surface 520 of the first plate 506. The second groove 504 extends across the inner surface 522 of the second plate 508. When assembled for operation, the inner facing surfaces 520, 522 of the first and second plates 506, 508 are disposed in abutment with each other and are aligned so that the first and second grooves 504, 506 together define the first guide passage 602 that defines a first opening 526 adjacent the drive mechanism 222 where the filament 222 enters the first guide passage 602. The first and second grooves 504, 506 also define a second opening 530 adjacent the mount portion 514 where the first guide passage 602 meets the second guide passage 306.

More particularly, the first guide passage 602 is generally cylindrical in contour and is sized to guide movement of a filament 202 through it in a substantially straight line direction along axis A-A between the first opening 526 and the second opening 530. The first guide passage 602 has a diameter that is wide enough to allow smooth uninterrupted movement of the filament 202 and that is narrow enough to prevent bending, crimping or bunching of the filament during such movement. In some embodiments, a contour of the first guide passage adjacent the first opening 526 is tapered so as to be wider where the filament enters the first opening and so as to smoothly taper down to a narrower diameter nearer the second opening 530, that is suitable for movement of the filament without bending, crimping or bunching.

The first and second plates 506, 508 also define opposed halves of a mounting portion 514. Each plate forms half of the cylindrical walls 532 a cylindrical recess 534 sized to receive the housing 302, which is cylindrical in shape in some embodiments. In addition, the annular recessed surfaces regions 510, 512 of the plates 506, 508 forman annular recess sized to receive the first outward extending (upper) ring 312 of the housing 302 so as to provide a groove mount surface with the housing 302 clamped. When the two plates are clamped together, the housing 302 can be clamped between them with the first, upper, outward ring seated within the annular recess, with a portion of the housing body seated within the cylindrical recess 534 and with the second (lower) annular ring 314 abutting a bottom surface 318 of the block 230 that faces the dispensing nozzle 206.

Thus, the first and second plates 506, 508 are releasably secured to each other with the low thermal conductivity housing 302 clamped between them. The first plate 506 is secured to a first surface of a generally planar platform 240 with a bottom facing surface (not shown) of the first plate 506 abutting against the platform 240. A bore hole 242 extends vertically through the second plate 508 from the outer facing top surface 524 of the second plate 508 to the inner facing bottom surface 522 of the second plate 508. A corresponding threaded bore hole 243 is formed in the inner facing surface 520 of the first pate 506. When the first and second plates 506, 508 are assembled, the bore 242 in the second plate 508 is aligned with the threaded bore 243 in the first plate 506. The first and second grooves 502, 504 are aligned to define the first guide passage 602. A fastener screw 244 is inserted through the bore hole 242 in the first plate and is screwed into the threaded bore hole 243 in the second plate to secure together the two plates 506, 508 with the housing 302 clamped within the mount region 514 between them. While a screw is disclosed as the fastener used to secure together the first and second plates, alternative fasters can be employed such as twist locks, thumb screws or quarter-turn fasteners, for example.

Referring again to FIGS. 2A-2C, the block 230 assembled by fastening together the first and second plates 506, 508 is secured to the platform 240. The first guide passage extends through the block 240. The two plates can be disassembled easily by removal of the fastener screw. When disassembled, the two halves of the first guide passage, i.e. defined by the first and second grooves 502, 504, are exposed for cleaning purposes, for example. The housing 302 also can be removed to facilitate the rapid replacement the entire hot end or parts thereof, for example.

As explained above, in some embodiments the first and second plates 506, 508 are formed of a high thermal conductivity material such as aluminum or copper, for example. The high thermal conductivity plates can act as a heat sink for the housing and other parts in the hot end. The close interfit between the housing 302 and the plates 506, 508 facilitates the transfer of heat from the housing to the plates. The plates' action in sinking heat can prolong the service life of the housing 302 and the hot end by reducing heat. Reduced heating can result in less clogging of the first and second passages 602, 306 with re-solidified material. Also, the inner low friction layer 309 can degrade if exposed to high temperatures for extended periods, and the plates' sinking heat from the housing sometimes can extend its life, for example.

The first and second plates 506, 508 are generally rectangular in shape although the outer contour of the plates is not important. Gripping grooves 248 are defined in each of outer facing sides of the plates distal from the first guide passage to provide a gripping surfaces to facilitate prying apart the first and second plates which fit together snugly when assembled.

Figure 6:
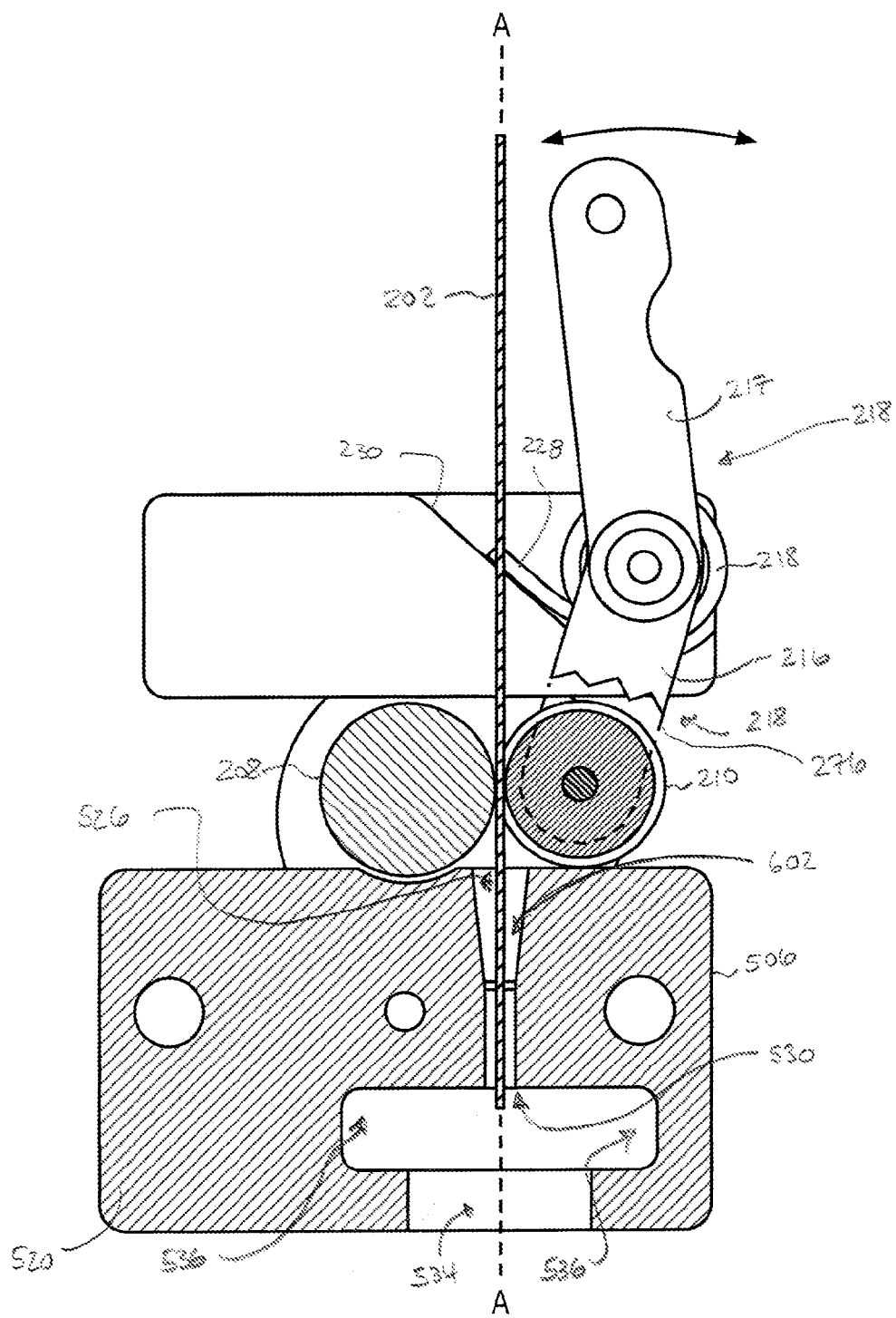
FIG. 6 is an illustrative cross-sectional drawing generally along dashed lines 6-6 in FIG. 2A that shows a filament extending along axis A-A between the drive roller and the idler roller through the first and second openings in the first guide passage.

FIG. 6 is an illustrative cross-sectional drawing generally along line 6-6 in FIG. 2A that shows a filament 202 extending along axis A-A between the drive roller 208 and the idler roller 210 through the first and second openings 526, 530 in the first guide passage 602. The first guide passage 602 within the assembled block defines the first opening 526 in a first side of the block 230 that is adjacent and between the driver roller and the idler roller. More specifically, the first opening is disposed in alignment with gap in which a filament 202 is fed between the rollers. The first opening 526 is sized to insertably receive a filament.

The first guide passage 602 within the assembled block 230 defines a second opening 530 formed in a second side of the block that is opposite the first side and adjacent the dispensing nozzle 206. The second opening 230 opens into annular recessed region 536 region and has a diameter that is sized to match a diameter size of the first inner tube section 308 of the second guide passage 306 within the insulating housing 302.

The motor 212 is secured to a second surface of the platform 240. The motor shaft 214 projects through a hole 250 in the platform 240 perpendicular to the first surface of the platform 240. More particularly, the shaft 214 is disposed adjacent the first opening 526 in the block 230 and extends perpendicular to the first and second guide passages 602, 306. The driver roller 208 is secured axially to the motor shaft 214. The motor 212 imparts rotational motion to the motor shaft 214 and to the driver wheel 208 so that they rotate in unison adjacent the first opening 526. In some embodiments, the motor 212 is a stepper motor. Alternatively, a servo motor can be employed.

Figure 7:
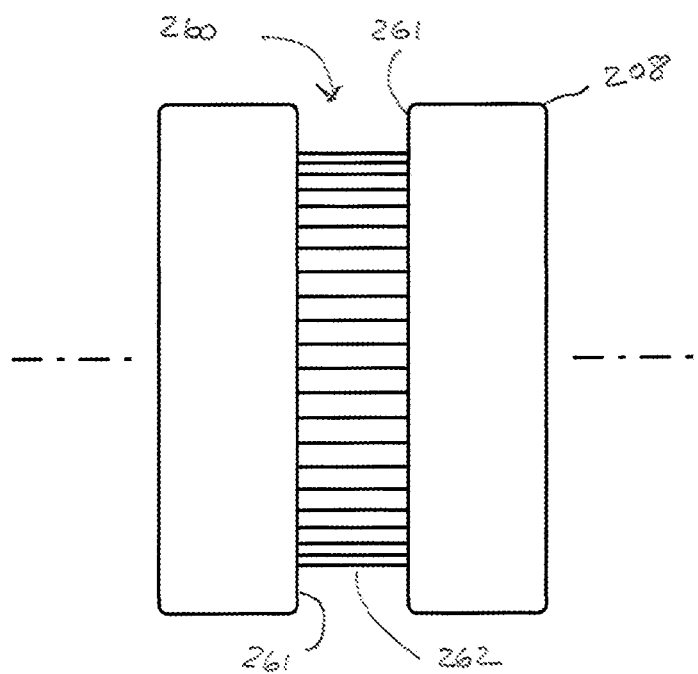
FIG. 7 is a side view of a driver roller in accordance with some embodiments.

FIG. 7 is a side view of a driver roller 208 in accordance with some embodiments. The driver roller is circumscribed with an annular groove 260 having side walls 261. A bottom surface 262 of the annular groove 260 is textured to increase frictional gripping action. In some embodiments, the textured surface comprises a knurled pattern in the form of a series of ridges oriented axially parallel to the spindle axis. In other embodiments, the knurled pattern may comprise a crisscross pattern, for example.

Returning again to FIGS. 2A-2C, the idler roller 210 has a smooth perimeter (not shown) that acts as a low friction rotatable bearing surface, in concert with the high friction textured surface of the idler wheel, to feed filament 202 into the first opening 526. More particularly, in some embodiments the idler wheel 210 is rotatably mounted on a pin axle 272 that extends parallel to the axis of rotation of the driver roller 208 between a first finger 274 and a second finger 276 that project longitudinally from a distal end of the first arm 216.

The fulcrum block 222 is mounted to the first surface of the platform 240 in front of and spaced apart from the first side of the block 230 formed by assembly of the first and second plates 506, 508. As explained above, the spring 218, which is has a first leg 224 that presses against a groove wall in the second beam arm 217 and has a second leg 228 that presses against a groove wall 230 in the fulcrum block 220, is configured to impart a rotational force about the pivot 220 to the beam 215 so as to urge the outer smooth bearing surface of the idler wheel 210 into close proximity with the textured surface of the driver wheel 208.

The second beam arm 217 acts as a lever. Applying a force to the second beam arm in a direction generally perpendicular to a longitudinal axis of the first guide passage 602 causes the first beam arm 216 and the idler wheel 210 mounted thereon to move away from the driver wheel 208. It will be appreciated that a force applied to the second arm 217 should be sufficient to overcome the spring force imparted by the spring that urges the idler wheel 210 into close proximity with the driver wheel 208. In some embodiments, a thumb notch 278 is formed in a side surface of the second beam 217 arm facing away from the path along which the filament 202 passes so as to provide an improved thumb grip for exerting force upon the second beam to rotate the idler wheel away from the driver wheel.

A computer 126 controls heat supplied to the filament 202. The liquefier includes a heating element 280 that is controlled by the computer and that is coupled to heat the pipe 304 to transmit to it sufficient heat convert a solid filament entering from the first guide passage to a liquid within the second guide passage. A heat sensing element 306 such as a negative temperature coefficient (NTC) thermistor or a thermocouple provides temperature information to the computer used to determine the heat to be provided. Details of operation of the liquefier are known to persons skilled in the art and need not be provided herein.

In operation, the drive roller 208 in concert with the idler roller 210 pull filament into the first opening 526. The filament follows along the first guide passage 602 to the second guide passage 306. The heating element 280 heats the filament 202 causing it to melt to a fluid state. The dispensing nozzle 206 deposits the melted filament material to a surface of an object that is under construction. During the filament feeding, heating and extrusion process, the insulating housing 302 acts to reduce transmission of heat to the filament 202, and the metal plates 506, 508 act to sink heat away from the filament 202.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. An extrusion head to receive a solid state material in filament form and to move the filament while guiding a direction of movement of the filament and to output the material in molten form comprising:

a high thermal conductivity metal block that defines a first guide passage sized to receive the filament and that includes a first opening and a second opening and that defines a recessed region adjacent to the second opening;

wherein the block includes a first plate that includes a first surface that defines a first groove and includes a second plate that includes a second surface that defines a second groove and a first portion of the recessed region; and wherein the first and second surfaces of the first and second plates are in abutting contact with the first and second grooves aligned to define the first guide passage and a second portion of the recessed region;

a drive mechanism configured to move the filament into the first guide passage through the first opening and out from the first guide passage through the second opening;

a low thermal conductivity housing defining an inner tube section providing a passage through the housing between a first end portion of the housing and a second end portion of the housing, wherein an outer surface of the first end portion of the housing is configured to snugly interfit with the recessed region of the block, and wherein the inner tube is aligned with the second opening of the first guide passage;

a high thermal conductivity pipe disposed within the inner tube section of the housing and defining at least a portion of a second guide passage that is aligned with the second opening of the first guide passage and that includes a first end portion and a second end portion, wherein the first end portion of the pipe is closer to the second opening of the first passage and to the first end portion of the housing than is the second end portion of the pipe, and wherein the first end portion of the pipe is sized to receive the filament; and a heating element configured to heat the second end portion of the pipe to convert the filament received at the first end portion of the pipe to molten form at the second end portion of the pipe.

2. The extrusion head of claim 1 further including:
a releasable fastener configured to secure the first and second plates with the housing between them.

3. The extrusion head of claim 1 further including:
a screw securing the first and second plates with the housing between them.

4. The extrusion head of claim 1,
wherein the first opening is tapered to be wider closer to where the filament enters the first opening.

5. The extrusion head of claim 1,
wherein the drive mechanism includes a driver roller and an idler roller disposed to move the filament received them though the first and second passages.

6. The extrusion head of claim 5 further including:
a fulcrum block;
a lever rotatable mounted to the fulcrum block;
wherein the idler roller is rotatably mounted to the lever; and
a spring disposed to provide forces to the fulcrum block and the lever that urge the idler roller towards the drive roller.

7. The extrusion head of claim 6,
wherein the spring includes a lever spring coil.

8. The extrusion head of claim 6 further including:
a platform;
wherein the block is mounted to the platform;
wherein the drive mechanism is mounted to the platform; and further including:
a motor mounted to the platform and disposed to actuate the drive mechanism.

9. The extrusion head of claim 1,
a heat insulating material disposed within the inner tube section of the housing between the first end portion of the pipe and the second opening of the first passage.

10. The extrusion head of claim 1 further including:
a motor disposed to actuate the drive mechanism.

* * * * *